United States Patent
Lahtinen et al.

(10) Patent No.: US 10,506,421 B2
(45) Date of Patent: *Dec. 10, 2019

(54) METHODS, APPARATUSES, SYSTEM, RELATED COMPUTER PROGRAMS AND DATA STRUCTURES FOR SUBSCRIPTION INFORMATION DELIVERY

(71) Applicant: NOKIA SOLUTIONS AND NETWORKS OY, Espoo (FI)

(72) Inventors: Lauri Kalevi Lahtinen, Espoo (FI); Juha Matias Kallio, Vantaa (FI); Miikka Juhana Poikselka, Espoo (FI); Markku Ahti Tuohino, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,398

(22) Filed: Aug. 14, 2018

(65) Prior Publication Data

US 2018/0376319 A1 Dec. 27, 2018

Related U.S. Application Data

(63) Continuation of application No. 12/656,764, filed on Feb. 16, 2010, now Pat. No. 10,080,130.

(30) Foreign Application Priority Data

Feb. 16, 2009 (WO) .................. PCT/EP2009/051798

(51) Int. Cl.
*H04L 12/66* (2006.01)
*H04W 8/06* (2009.01)
(Continued)

(52) U.S. Cl.
CPC ............... *H04W 8/06* (2013.01); *H04W 8/18* (2013.01); *H04W 8/20* (2013.01); *H04W 12/06* (2013.01);
(Continued)

(58) Field of Classification Search
CPC . H04W 36/0022; H04W 76/16; H04W 36/14; H04W 36/0033; H04W 76/02;
(Continued)

(56) References Cited

U.S. PATENT DOCUMENTS

2006/0067338 A1 3/2006 Hua et al.
2007/0130471 A1 6/2007 Walker Pina
(Continued)

FOREIGN PATENT DOCUMENTS

WO 2008/104225 A1 9/2008

OTHER PUBLICATIONS

European Office Action issued in corresponding European Patent Application No. 09779059.6 dated Jul. 26, 2017. No copy provided, per MPEP 609. Copy submitted in parent U.S. Appl. No. 12/656,764.
(Continued)

*Primary Examiner* — Khaled M Kassim
*Assistant Examiner* — Najeeb Ansari
(74) *Attorney, Agent, or Firm* — Squire Patton Boggs (US) LLP

(57) ABSTRACT

A method and corresponding apparatus are configured to transmit, during terminal attachment to an evolved packet system and in at least a portion of a diameter command, centralized service-related subscription information. The method and apparatus are also configured to transmit, in an initial message of a call continuity procedure, received centralized service-related subscription information. The method and apparatus are configured to operate according to
(Continued)

the received centralized service-related subscription information in the initial message of the call continuity procedure.

5 Claims, 9 Drawing Sheets

(51) Int. Cl.
*H04W 8/20* (2009.01)
*H04W 8/18* (2009.01)
*H04W 48/18* (2009.01)
*H04W 12/06* (2009.01)
*H04W 36/00* (2009.01)
*H04L 29/06* (2006.01)
*H04W 76/16* (2018.01)

(52) U.S. Cl.
CPC ......... *H04W 48/18* (2013.01); *H04L 65/1016* (2013.01); *H04W 36/0022* (2013.01); *H04W 76/16* (2018.02)

(58) Field of Classification Search
CPC ......... H04W 8/08; H04W 48/18; H04W 8/02; H04W 48/02; H04W 8/18; H04W 8/04; H04W 12/06; H04W 8/06; H04W 8/12; H04W 60/00; H04W 8/20
See application file for complete search history.

(56) References Cited

U.S. PATENT DOCUMENTS

| | | |
|---|---|---|
| 2008/0181178 A1 | 7/2008 | Shaheen |
| 2008/0268819 A1 | 10/2008 | Zhu et al. |
| 2008/0268847 A1 | 10/2008 | Mukherjee et al. |
| 2009/0238143 A1 | 9/2009 | Mukherjee et al. |
| 2009/0270099 A1 | 10/2009 | Gallagher et al. |
| 2010/0088374 A1 | 4/2010 | Astrom |
| 2010/0098023 A1 | 4/2010 | Aghili et al. |
| 2010/0135246 A1 | 6/2010 | Hallental |
| 2010/0177735 A1 | 7/2010 | Bihannic et al. |
| 2010/0323700 A1* | 12/2010 | Bachmann ........ H04W 36/0066 455/436 |
| 2011/0003595 A1 | 1/2011 | Shan |
| 2011/0022686 A1 | 1/2011 | Ding |
| 2011/0200011 A1* | 8/2011 | Rune ................. H04W 36/0022 370/331 |
| 2011/0222532 A1 | 9/2011 | Noldus |
| 2011/0249652 A1 | 10/2011 | Keller et al. |
| 2011/0268083 A1 | 11/2011 | Ostrup et al. |
| 2011/0281584 A1 | 11/2011 | Sander et al. |
| 2012/0177194 A1 | 7/2012 | Yoon et al. |
| 2012/0269182 A1 | 10/2012 | Walker |

OTHER PUBLICATIONS

3GPP TS 29.272 V8.1.1 (Jan. 2009), Evolved Packet System; Mobility Management Entity and Serving GPRS Support Node Related Interfaces Based on Diameter Protocol. No copy provided, per MPEP 609. Copy submitted in parent U.S. Appl. No. 12/656,764.

3GPP TS 23.292 V8.2.0 (Dec. 2008), Technical Specification Group Services and System Aspects; IP Multimedia Subsystem Centralized Services; Stage 2, Release 8. No copy provided, per MPEP 609. Copy submitted in parent U.S. Appl. No. 12/656,764.

3GPP TR 23.892 V0.5.0 (Apr. 2007), Technical Specification Group Services and System Aspects; IP Multimedia System Centralized Services; Release 8. No copy provided, per MPEP 609. Copy submitted in parent U.S. Appl. No. 12/656,764.

3GPP TS 23.216 V8.0.0 (Jun. 2008), Technical Specification Group Services and System Aspects; Single Radio Voice Call Continuity; Stage 2, Release 8. No copy provided, per MPEP 609. Copy submitted in parent U.S. Appl. No. 12/656,764.

Jun. 11, 2019 Office Action issued in European Patent Application No. 09779059.6.

* cited by examiner

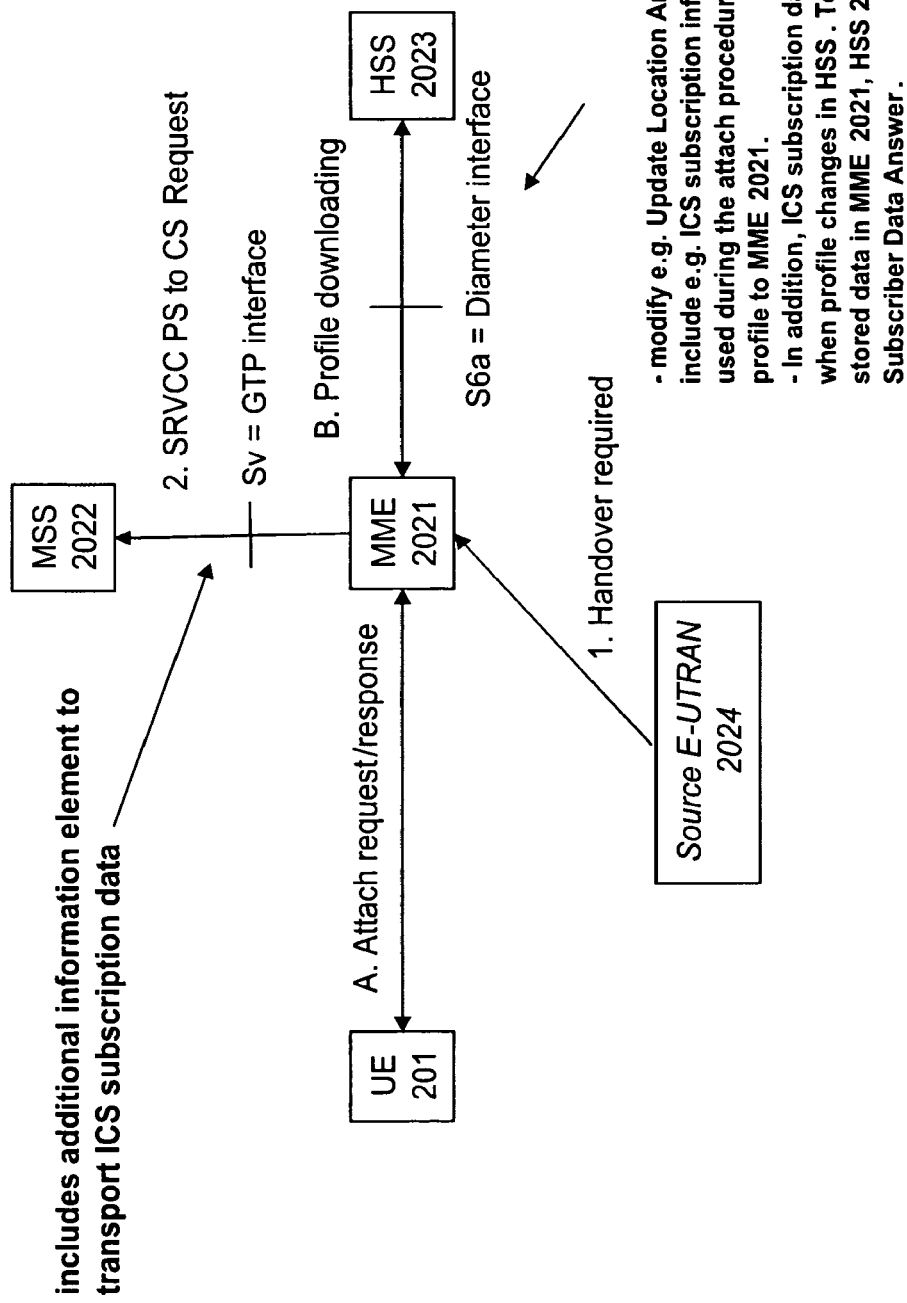

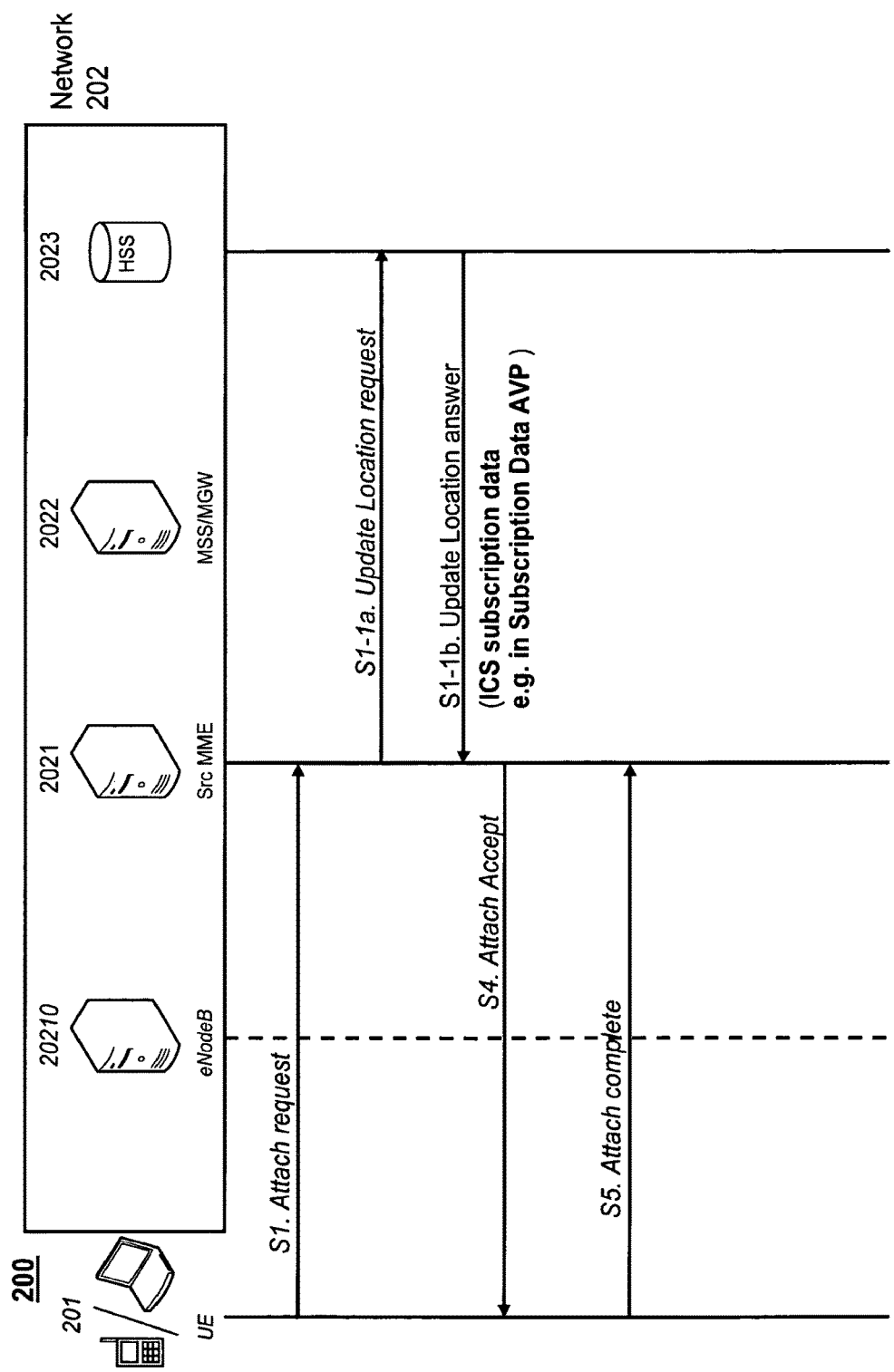

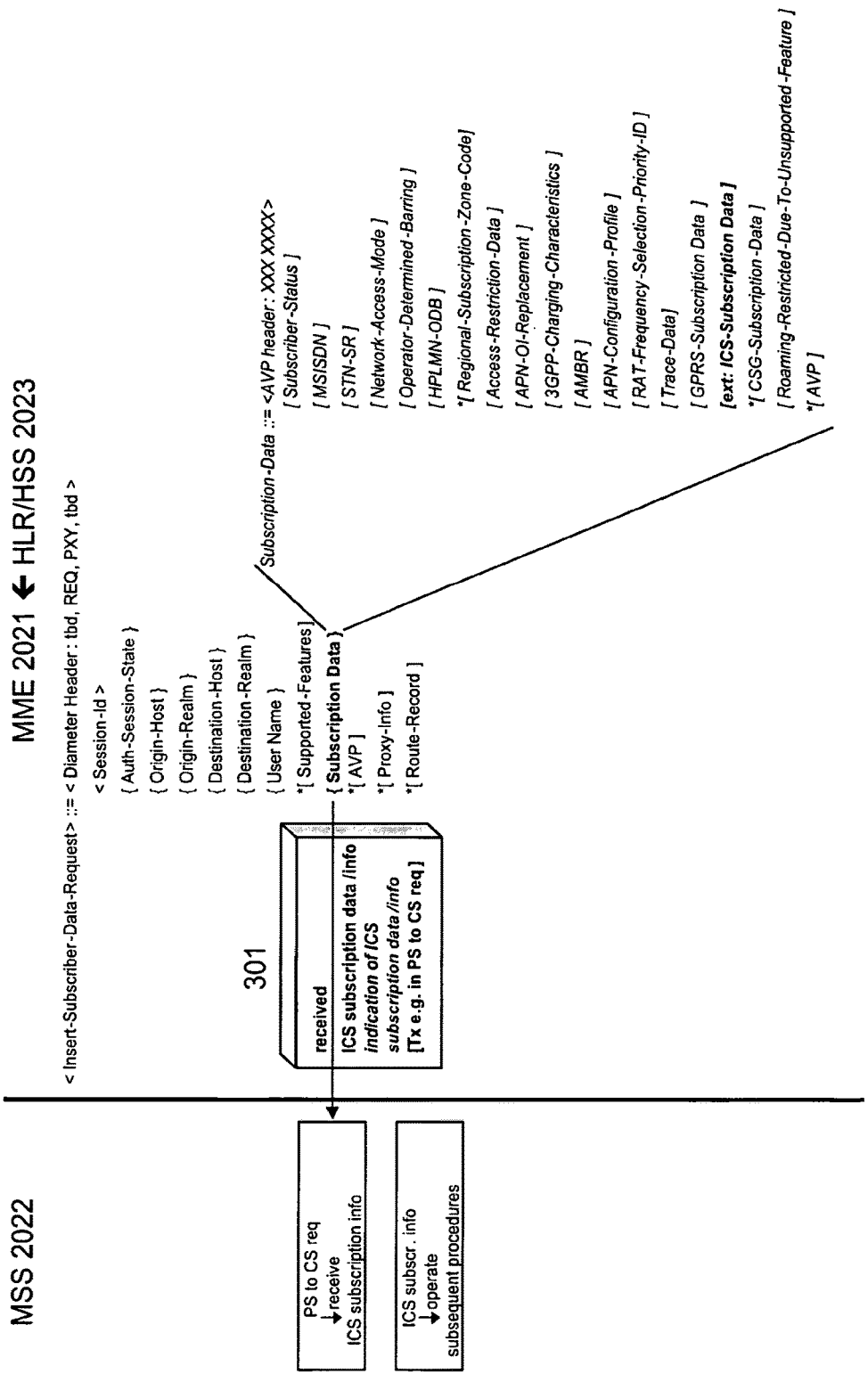

METHODS, APPARATUSES, SYSTEM, RELATED COMPUTER PROGRAMS AND DATA STRUCTURES FOR SUBSCRIPTION INFORMATION DELIVERY

CROSS REFERENCED TO RELATED APPLICATION

This application is a Continuation of co-pending U.S. patent application Ser. No. 12/656,764, filed on Feb. 16, 2010, which claims priority of PCT Patent Application No. PCT/EP2009/051798 filed Feb. 16, 2009. The entire content of the above-referenced applications is hereby incorporated by reference.

FIELD OF THE INVENTION

Examples of the present invention relate to subscription information delivery. More specifically, the examples of the present invention relate to methods, apparatuses, a system, related computer programs and data structures for subscription information delivery. The examples of the present invention may be applicable to single radio voice call continuity (SR-VCC).

BACKGROUND $3^{rd}$ generation partnership project (3GPP) is working to define the SR-VCC procedures in Release 8. Stage 2 of SR-VCC is defined e.g. in 3GPP TS 23.216. SR-VCC may enable a user equipment (UE) to perform an inter-domain handover from long term evolution (LTE) to circuit switched (CS). In this way, the voice over internet protocol (VoIP) session over IP multimedia subsystem (IMS) over the LTE access can be transferred to the CS network, when the LTE coverage is getting weaker.

FIG. 1 shows a domain transfer from the LTE (VoIP) to $2^{nd}$ generation/$3^{rd}$ (2/3G) CS access as defined e.g. by Release 8 SR-VCC. As shown in FIG. 1, a communication network 100 comprises a user-actuated UE 101 capable of LTE packet switching (PS) and VoIP, a network 102 having both a LTE radio network and a 2G/3G generation CS network, and the internet 103. In turn, the network 102 comprises a mobility management entity (MME) 1021, a mobile switching center server (MSS) 1022, a database 1023 for providing user data for both packet switched and circuit switched entities.

The transfer to the CS side is controlled by the network 102, and the terminal/UE 101 is aware of the situation only when the UE 101 is commanded to hand over to the 2/3G CS-access. For enabling the routing to the correct mobile switching center server (MSS) 1022, home location register (HLR) information is updated after the handover is completed.

Release 8 defines also an IMS centralized services (ICS) functionality. With this functionality, the CS-access of the UE 101 can be adapted to the IMS environment with enhanced MSS (eMSS) functionality. The information is received during the location updating toward the HLR. Based on the HLR information the MSS can initiate ICS functionalities toward the IMS. In other words, Release 8 defines an ICS functionality which allows the CS access of the UE 101 to be adapted to IMS environment via an ICS enhanced MSC server (IMSC). Accordingly, the IMSC may have a direct SIP communication with IMS core network. The information, whether a subscriber is an ICS subscriber, is received from the HLR during the location updating after the handover. Based on this information, the ICS functionality can be initiated.

In consideration of the above, according to examples of the present invention, methods, apparatuses, a system, related computer programs and data structures for subscription information delivery are provided.

According to an example of the present invention, in a first aspect, this object is for example achieved by a method comprising:

transmitting, during terminal attachment to evolved packet system and in at least a portion of a diameter command, centralized service-related subscription information.

According to further refinements of the example of the present invention as defined under the above first aspect, the diameter command is an insert subscriber data request command and the portion is one of a subscription data attribute value pair and an extension of a subscription data attribute value pair;

the transmitting is performed responsive to receiving a diameter request for the centralized service-related subscription information;

the method further comprises receiving, prior to the transmitting, the diameter request for the centralized service-related subscription information;

the diameter request is an update location request command;

the diameter command is an update location answer command and the portion is one of a subscription data attribute value pair and an extension of a subscription data attribute value pair;

the diameter command further comprises an indication of the centralized service-related subscription information.

According to an example of the present invention, in a second aspect, this object is for example achieved by a method comprising:

transmitting, in an initial message of a call continuity procedure, received centralized service-related subscription information.

According to further refinements of the example of the present invention as defined under the above second aspect, the method further comprises receiving the centralized service-related subscription information during terminal attachment to evolved packet system;

the centralized service-related subscription information is received constituting at least a portion of a diameter command;

the diameter command is an insert subscriber data request command and the portion is one of a subscription data attribute value pair and an extension of a subscription data attribute value pair;

the diameter command is an update location answer command and the portion is one of a subscription data attribute value pair and an extension of a subscription data attribute value pair.

According to an example of the present invention, in a third aspect, this object is for example achieved by a method comprising:

operating according to centralized service-related subscription information received in an initial message of a call continuity procedure.

According to further refinements of the example of the present invention as defined under the above third aspect, the method further comprises receiving the initial message of the call continuity procedure;

the operating comprises one of operating as mobile switching center server enhanced for centralized services and operating as basic mobile switching center server enhanced for the call continuity procedure.

According to further refinements of the example of the present invention as defined under the above second and third aspects, the initial message further comprises an indication of the centralized service-related subscription information.

According to further refinements of the example of the present invention as defined under the above first to third aspects, the initial message is constituted by a packet switched to circuit switched request;

the initial message is constituted by a single radio voice call continuity packet switched to circuit switched request;

the initial message is transmitted via a general packet radio service tunneling protocol interface;

the call continuity procedure is constituted by a single radio voice call continuity procedure;

the centralized service-related subscription information relates to internet protocol multimedia subsystem centralized services;

the centralized service-related subscription information constitutes an additional information element in the initial message.

According to an example of the present invention, in a fourth aspect, this object is for example achieved by an apparatus comprising:

a transmitter configured to transmit, during terminal attachment to evolved packet system and in at least a portion of a diameter command, centralized service-related subscription information.

According to further refinements of the example of the present invention as defined under the above fourth aspect, the diameter command is an insert subscriber data request command and the portion is one of a subscription data attribute value pair and an extension of a subscription data attribute value pair;

the transmitter is further configured to transmit responsive to receiving a diameter request for the centralized service-related subscription information;

the apparatus further comprises a receiver configured to receive, prior to the transmitting performed by the transmitter, the diameter request for the centralized service-related subscription information;

the diameter request is an update location request command;

the diameter command is an update location answer command and the portion is one of a subscription data attribute value pair and an extension of a subscription data attribute value pair;

the diameter command further comprises an indication of the centralized service-related subscription information;

the apparatus is constituted by one of a home location register and a home subscriber server.

According to an example of the present invention, in a fifth aspect, this object is for example achieved by an apparatus comprising:

a transmitter configured to transmit, in an initial message of a call continuity procedure, received centralized service-related subscription information.

According to further refinements of the example of the present invention as defined under the above fifth aspect, the apparatus further comprises a receiver configured to receive the centralized service-related subscription information during terminal attachment to evolved packet system;

the centralized service-related subscription information is received constituting at least a portion of a diameter command;

the diameter command is an insert subscriber data request command and the portion is one of a subscription data attribute value pair and an extension of a subscription data attribute value pair;

the diameter command is an update location answer command and the portion is one of a subscription data attribute value pair and an extension of a subscription data attribute value pair;

the apparatus is constituted by a mobility management entity.

According to an example of the present invention, in a sixth aspect, this object is for example achieved by an apparatus comprising:

an operator configured to operate according to centralized service-related subscription information received in an initial message of a call continuity procedure.

According to further refinements of the example of the present invention as defined under the above sixth aspect, the apparatus further comprises a receiver configured to receive the initial message of the call continuity procedure;

the operating comprises one of operating as mobile switching center server enhanced for centralized services and operating as basic mobile switching center server enhanced for the call continuity procedure;

the apparatus is constituted by an enhanced mobile switching center server.

According to further refinements of the example of the present invention as defined under the above fifth and sixth aspects, the initial message further comprises an indication of the centralized service related subscription information.

According to further refinements of the example of the present invention as defined under the above fourth to sixth aspects, the initial message is constituted by a packet switched to circuit switched request;

the initial message is constituted by a single radio voice call continuity packet switched to circuit switched request;

the transmitter is configured to transmit the initial message via a general packet radio service tunneling protocol interface;

the call continuity procedure is constituted by a single radio voice call continuity procedure;

the centralized service-related subscription information relates to internet protocol multimedia subsystem centralized services;

the centralized service-related subscription information constitutes an additional information element in the initial message;

at least one, or more of a transmitter, an operator and the apparatus is implemented as a chipset or module.

According to an example of the present invention, in a seventh aspect, this object is for example achieved by an apparatus comprising:

means for transmitting, during terminal attachment to evolved packet system and in at least a portion of a diameter command, centralized service-related subscription information.

According to further refinements of the example of the present invention as defined under the above seventh aspect, the diameter command is an insert subscriber data request command and the portion is one of a subscription data attribute value pair and an extension of a subscription data attribute value pair;

the means for transmitting is further configured to transmit responsive to receiving a diameter request for the centralized service-related subscription information;

the apparatus further comprises means for receiving, prior to the transmitting performed by the means for transmitting, the diameter request for the centralized service-related subscription information;

the diameter request is an update location request command;

the diameter command is an update location answer command and the portion is one of a subscription data attribute value pair and an extension of a subscription data attribute value pair;

the diameter command further comprises an indication of the centralized service-related subscription information;

the apparatus is constituted by one of a home location register and a home subscriber server.

According to an example of the present invention, in an eighth aspect, this object is for example achieved by an apparatus comprising:

means for transmitting, in an initial message of a call continuity procedure, received centralized service-related subscription information.

According to further refinements of the example of the present invention as defined under the above eighth aspect, the apparatus further comprises means for receiving the centralized service-related subscription information during terminal attachment to evolved packet system;

the centralized service-related subscription information is received constituting at least a portion of a diameter command;

the diameter command is an insert subscriber data request command and the portion is one of a subscription data attribute value pair and an extension of a subscription data attribute value pair;

the diameter command is an update location answer command and the portion is one of a subscription data attribute value pair and an extension of a subscription data attribute value pair;

the apparatus is constituted by a mobility management entity.

According to an example of the present invention, in a ninth aspect, this object is for example achieved by an apparatus comprising:

means for operating according to centralized service-related subscription information received in an initial message of a call continuity procedure.

According to further refinements of the example of the present invention as defined under the above ninth aspect, the apparatus further comprises means for receiving the initial message of the call continuity procedure;

the operating comprises one of operating as mobile switching center server enhanced for centralized services and operating as basic mobile switching center server enhanced for the call continuity procedure;

the apparatus is constituted by an enhanced mobile switching center server.

According to further refinements of the example of the present invention as defined under the above eighth and ninth aspects, the initial message further comprises an indication of the centralized service-related subscription information.

According to further refinements of the example of the present invention as defined under the above seventh to ninth aspects, the initial message is constituted by a packet switched to circuit switched request;

the initial message is constituted by a single radio voice call continuity packet switched to circuit switched request;

the means for transmitting is configured to transmit the initial message via a general packet radio service tunneling protocol interface;

the call continuity procedure is constituted by a single radio voice call continuity procedure;

the centralized service-related subscription information relates to internet protocol multimedia subsystem centralized services;

the centralized service-related subscription information constitutes an additional information element in the initial message;

at least one, or more of means for transmitting, means for operating and the apparatus is implemented as a chipset or module.

According to an example of the present invention, in a tenth aspect, this object is for example achieved by a system comprising:

an apparatus according to the above fourth and seventh aspects;

an apparatus according to the above fifth and eighth aspects; and an apparatus according to the above sixth and ninth aspects.

According to an example of the present invention, in an eleventh aspect, this object is for example achieved by a computer program embodied on a computer readable medium, comprising code means for performing a method comprising:

transmitting, during terminal attachment to evolved packet system and in at least a portion of a diameter command, centralized service-related subscription information.

According to an example of the present invention, in a twelfth aspect, this object is for example achieved by a computer program embodied on a computer readable medium, comprising code means for performing a method comprising:

transmitting, in an initial message of a call continuity procedure, received centralized service-related subscription information.

According to an example of the present invention, in a thirteenth aspect, this object is for example achieved by a computer program embodied on a computer readable medium, comprising code means for performing a method comprising:

operating according to centralized service-related subscription information received in an initial message of a call continuity procedure.

According to an example of the present invention, in a fourteenth aspect, this object is for example achieved by a data structure comprising:

at least a portion of a diameter command for conveying centralized service-related subscription information.

According to further refinements of the example of the present invention as defined under the above fourteenth aspect, the diameter command is an insert subscriber data request command and the portion is one of a subscription data attribute value pair and an extension of a subscription data attribute value pair;

the diameter command is an update location answer command and the portion is one of a subscription data attribute value pair and an extension of a subscription data attribute value pair.

According to an example of the present invention, in a fifteenth aspect, this object is for example achieved by a data structure comprising:

an initial message of a call continuity procedure comprising received centralized service-related subscription information.

In this connection, the example of the present invention enables one or more of the following:

The HLR information may be updated prior to completion of the handover, so as to avoid that the terminal's information is different from the HLR information and to avoid unsuccessful call attempts.

No need for the anchoring call to IMS to be routed through the PSTN as a CS break-in call. In addition, there is no need for any communication using other protocols like bearer independent call control (BICC) or integrated service digital network (ISDN) user part (ISUP) and possibly involving a media gateway control function (MGCF) as a session initiation protocol (SIP) converter in the routing path.

The ICS can be started during the handover, because the subscriber information is received prior to completion of the handover procedure.

According to an exemplary embodiment of the present invention there is provided an apparatus, comprising a transmitter configured to transmit, during terminal attachment to evolved packet system and in at least a portion of a diameter command, centralized service-related subscription information, wherein at least one, or more of a transmitter, an operator and the apparatus is implemented as a chipset or module.

According to an exemplary embodiment of the present invention there is provided an apparatus, comprising a transmitter configured to transmit, in an initial message of a call continuity procedure, received centralized service-related subscription information, wherein at least one, or more of a transmitter, an operator and the apparatus is implemented as a chipset or module.

According to an exemplary embodiment of the present invention there is provided an apparatus, comprising an operator configured to operate according to centralized service-related subscription information received in an initial message of a call continuity procedure, wherein at least one, or more of a transmitter, an operator and the apparatus is implemented as a chipset or module.

BRIEF DESCRIPTION OF THE DRAWINGS

The example of the present invention is described herein below with reference to the accompanying drawings, in which:

FIGS. 2A and 2B show the principle underlying the examples of the present invention;

FIG. 3A shows methods for subscription information delivery according to a first example of the present invention;

FIG. 5B shows a data structure for subscription information delivery according to the second example of the present invention.

DETAILED DESCRIPTION OF THE EXAMPLES OF THE PRESENT INVENTION

The examples of the present invention are described herein below by way of example with reference to the accompanying drawings.

It is to be noted that for this description, the terms "PS to CS request; SR-VCC; ICS; update location request command; and update location answer command, insert subscriber data request command" are examples for "initial message; call continuity procedure; centralized service; diameter request; and diameter command", respectively, without restricting the latter-named terms to the special technical or implementation details imposed to the first-named terms.

First Example

Figure 1:
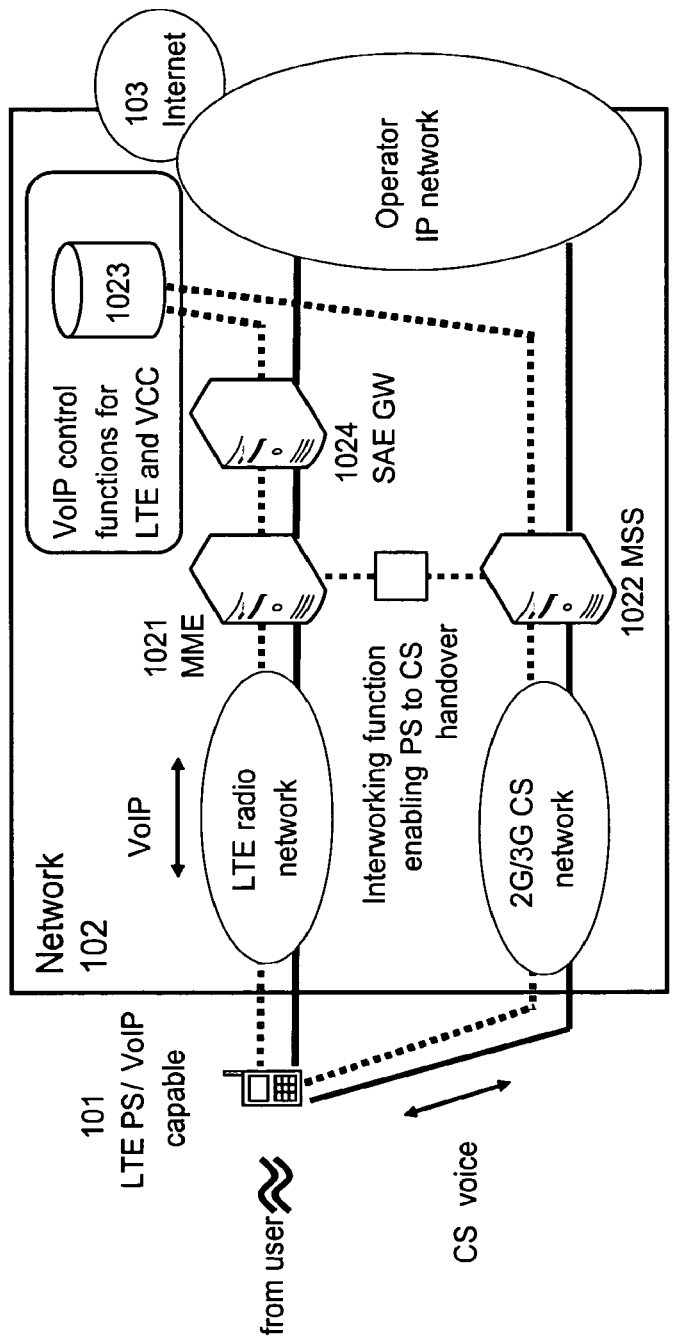
FIG. 1 shows the above-described domain transfer from the LTE (VoIP) to 2/3G CS access as defined e.g. by Release 8 SR-VCC.
Figure 2B:
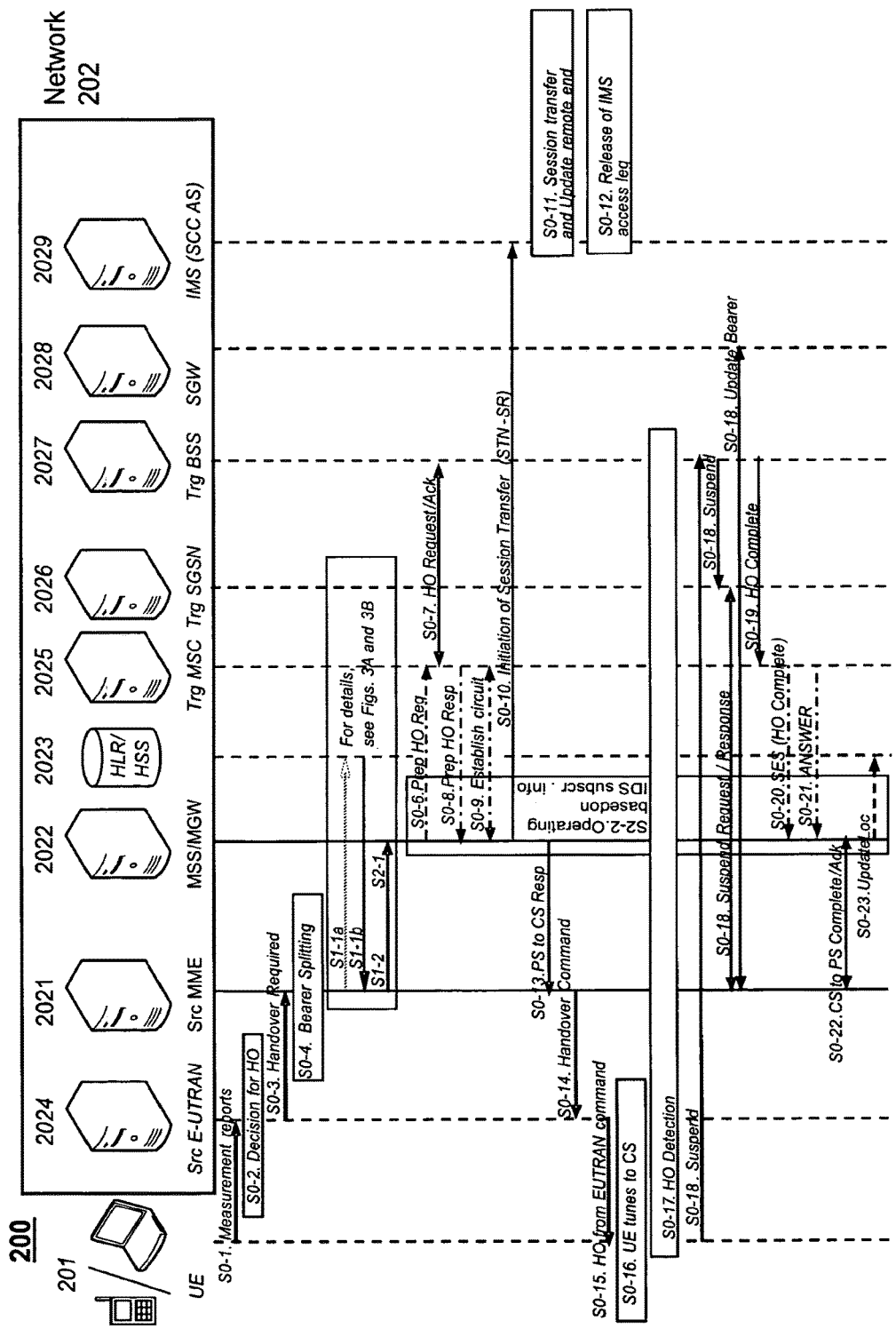
Figure 3B:
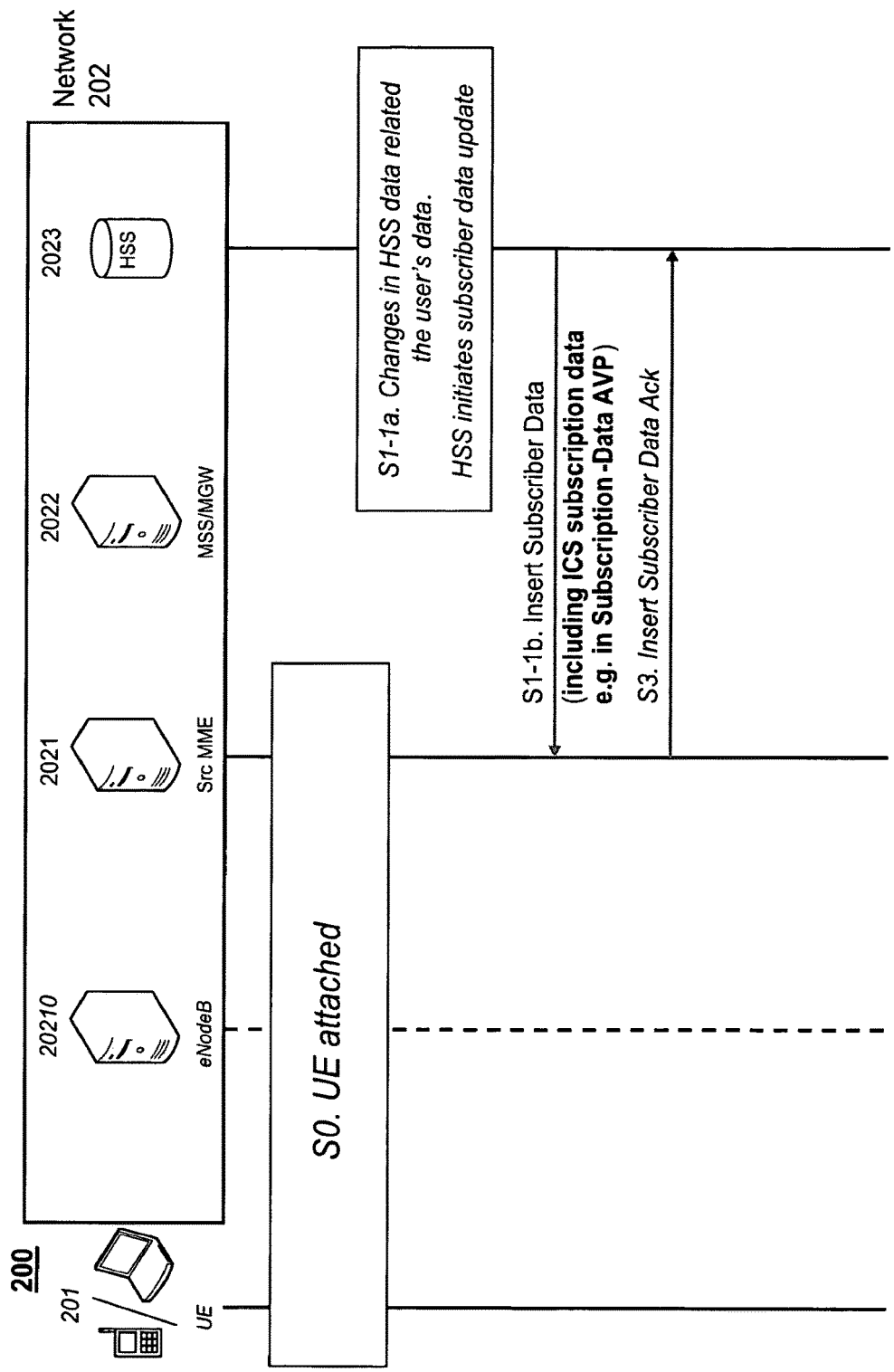
FIG. 3B shows methods for subscription information delivery according to a second example of the present invention.

FIGS. 2A, 2B, 3A show methods for subscription information delivery according to the first example of the present invention. Signaling between elements is indicated in horizontal direction, while time aspects between signaling may be reflected in the vertical arrangement of the signaling sequence as well as in the sequence numbers. It is to be noted that the time aspects indicated in FIGS. 2B and 3A do not necessarily restrict any one of the method steps shown to the step sequence outlined. This applies in particular to method steps that are functionally disjunctive with each other. Within FIGS. 2B and 3A, for ease of description, means or portions which may provide main functionalities are depicted with solid functional blocks or arrows and/or a normal font, while means or portions which may provide optional functions are depicted with dashed functional blocks or arrows and/or an italic font.

As shown in FIG. 2B, a communication system 200 may comprise a UE 201 and a network 202. In turn, the network 202 may comprise a source MME 2021, a MSS/media gateway (MGW) 2022, a HLR/home subscriber server (HSS) 2023, a source evolved universal mobile telecommunications system (UMTS) terrestrial radio access network (E-UTRAN) 2024, a target mobile switching center server (MSS) 2025, a target serving general packet radio service (GPRS) support node (SGSN) 2026, a target base station subsystem (BSS) 2027, a serving gateway (SGW) 2028 and an IMS service centralization and continuity application server (SCC AS) 2029.

In optional preparatory steps S0-1 to S0-4, e.g. UE 201 may send measurement reports to E-UTRAN. Based on UE measurement reports, the source E-UTRAN 2024 decides to trigger an SR-VCC handover to circuit switched network. Source E-UTRAN 2024 sends Handover Required (Target ID, generic Source to Target Transparent Container) message to the source MME 2021. The E-UTRAN 2024 places the "old BSS to new BSS transparent container" for the CS domain in the generic Source to Target Transparent Container. The container type also indicates to the MME that this is a SR-VCC handover operation only towards the CS domain. Based on the QCI associated with the voice bearer and the SR-VCC handover indication, the source MME 2021 splits the voice bearer from the non-voice bearers and initiates the PS-CS handover procedure for the voice bearer only towards MSS 2022.

As shown in FIGS. 2B and 3A, in an optional step S1-1*a*, e.g. the HSS 2023 may perform receiving, prior to a subsequent transmitting, a diameter request for centralized service-related subscription information.

As shown in FIGS. 2B and 3A, in step S1-1*b*, e.g. the HLR 2023 may perform transmitting, during terminal attachment to evolved packet system and in at least a portion of a diameter command, the centralized service-related subscription information.

As a development of the method related to the HSS 2023, the transmitting may be performed responsive to the receiving of the diameter request for the centralized service-related subscription information. If so, the diameter request may be an update location request command.

In addition, the diameter command may be an update location answer command and the portion may be a subscription data attribute value pair or an extension of the subscription data attribute value pair. Furthermore, the diameter command may further comprise an indication of the centralized service-related subscription information.

First, in an optional step S1-1*b*, e.g. the MME 2021 may perform receiving centralized service-related subscription information (e.g. ICS subscription information) during terminal attachment to evolved packet system (EPS).

Then, as shown in FIG. 2B, in step S1-2, e.g. the MME 2021 may perform transmitting, in an initial message (e.g. PS to CS Request) of a call continuity procedure (e.g. SR-VCC), the received centralized service (e.g. (ICS))-related subscription information.

In an optional step S2-1, e.g. the MSS 2022 may perform receiving the initial message of the call continuity procedure.

Then, in step S2-2, e.g. the MSS 2022 may perform operating according to the centralized service-related subscription information received in the initial message (e.g. PS to CS Request) of the call continuity procedure (e.g. SR-VCC).

As for developments of the methods according to an example of the present invention, the operating may comprise operating as mobile switching center server enhanced for centralized services or operating as basic mobile switching center server enhanced for the call continuity procedure. Further, the initial message may further comprise an indication of the centralized service-related subscription information.

In addition, the centralized service-related subscription information may be received constituting at least a portion of a diameter command. Further, the diameter command may be an update location answer command and the portion may be a subscription data attribute value pair or an extension to that attribute value pair.

Finally, the initial message may be constituted by a (single radio voice call continuity) packet switched to circuit switched request, the call continuity procedure may be constituted by a single radio voice call continuity procedure; the initial message may be transmitted via a general packet radio service tunneling protocol interface; the centralized service-related subscription information may relate to internet protocol multimedia subsystem centralized services, and/or the centralized service-related subscription information may constitute an additional information element in the initial message.

The optional subsequent steps S0-6 to S0-23 shown in FIG. 2B serve for completing the handover procedure.

Figure 4A:
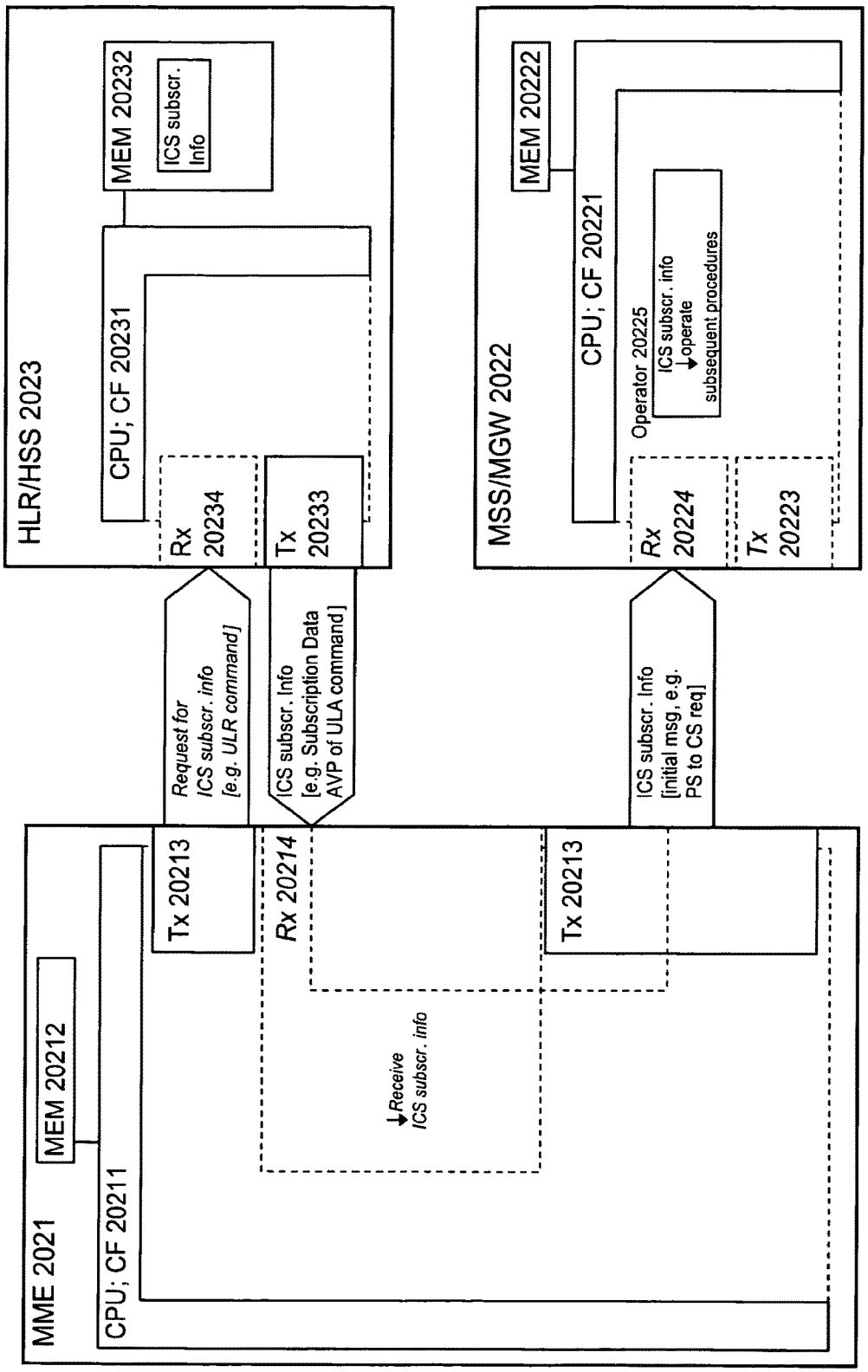
FIG. 4A shows apparatuses for subscription information delivery according to the first example of the present invention.
Figure 4B:
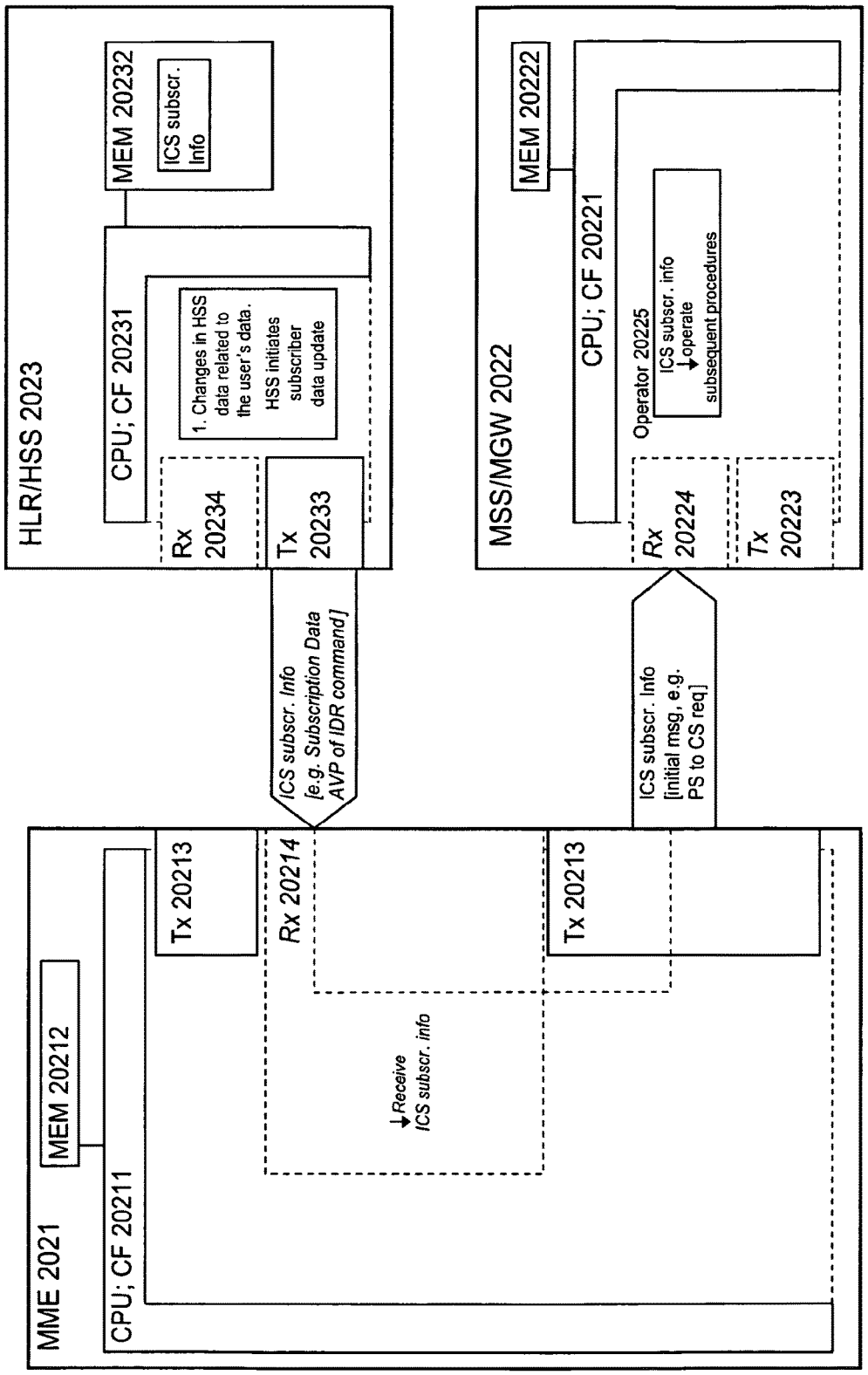
FIG. 4B shows apparatuses for subscription information delivery according to the second example of the present invention.

FIGS. 2A and 4A show apparatuses (e.g. MME 2021, MSS 2022 and HSS 2023) for subscription information delivery according to the first example of the present invention. Within FIG. 4A, for ease of description, means or portions which may provide main functionalities are depicted with solid functional blocks or arrows and a normal font, while means or portions which may provide optional functions are depicted with dashed functional blocks or arrows and an italic font.

The MME 2021 may comprise a CPU (or core functionality CF) 20211, a memory 20212, a transmitter (or means for transmitting) 20213, and an optional receiver (or means for receiving) 20214.

Further, the MSS 2022 may comprise a CPU (or core functionality CF) 20221, a memory 20222, an optional transmitter (or means for transmitting) 20223, an optional receiver (or means for receiving) 20224 and an operator (or means for operating) 20225.

Finally, the HLR/HSS 2023 may comprise a CPU (or core functionality CF) 20231, a memory 20232, a transmitter (or means for transmitting) 20233, and an optional receiver (or means for receiving) 20224. The memory 20232 may be configured to hold the centralized service-related subscription information (e.g. ICS subscription information).

As indicated by the dashed extension of the functional block of the CPU 20221, the operator 20225 of the MSS 2022 may be a functionality running on the CPU 20221 of the MSS 2022, respectively, or may alternatively be a separate functional entity or means.

The CPUs 20x1 (wherein x=21, 22 and 23) may respectively be configured to process various data inputs and to control the functions of the memories 20x2, the transmitters 202x3 and the receivers 20x4 (and the operator 20225 of the MSS 2022). The memories 20x2 may serve e.g. for storing code means for carrying out e.g. the methods according to the example of the present invention, when run e.g. on the CPUs 20x1. It is to be noted that the transmitters 20x3 and the receivers 20x4 may alternatively be provided as respective integral transceivers. It is further to be noted that the transmitters/receivers may be implemented i) as physical transmitters/receivers for transceiving e.g. via the air interface (e.g. between the UE 101 and the source E-UTRAN 2024 shown in FIG. 2), ii) as routing entities e.g. for transmitting/receiving data packets e.g. in a PS (packet switching) network (e.g. between the MME 2021 and the MSS 2022 when disposed as separate network entities), iii) as functionalities for writing/reading information into/from a given memory area (e.g. in case of shared/common CPUs or memories e.g. of the MME 2021 and the MSS 2022 when disposed as an integral network entity), or iv) as any suitable combination of i) to iii).

As shown in FIG. 4A, e.g. the receiver 20234 of the HLR 2023 may be configured to receive, prior to a subsequent transmission performed by the transmitter 20233, a diameter request for centralized service-related subscription information.

E.g. the transmitter 20233 of the HLR 2023 may transmit, during terminal attachment to evolved packet system and in at least a portion of a diameter command, the centralized service-related subscription information.

As a development of the HSS 2023, the transmitting may be performed responsive to the receiving of the diameter request for the centralized service-related subscription information. If so, the diameter request may be an update location request command.

In addition, the diameter command may be an update location answer command and the portion may be a subscription data attribute value pair or an extension of the subscription data attribute value pair. Furthermore, the diameter command may further comprise an indication of the centralized service-related subscription information.

E.g. the receiver 20214 of the MME 2021 may receive the centralized service-related subscription information (e.g. ICS subscription information) during terminal attachment to evolved packet system (EPS) e.g. from the HLR/HSS 2023.

Then, e.g. the transmitter 20213 of the MME 2021 may transmit, in an initial message (e.g. PS to CS Request) of a call continuity procedure (e.g. SR-VCC), the received centralized service (e.g. (ICS))-related subscription information.

E.g. the receiver 20224 of the MSS 2022 may receive the initial message of the call continuity procedure.

Then, e.g. the operator 20225 of the MSS 2022 may operate according to the centralized service-related subscription information received in the initial message (e.g. PS to CS Request) of the call continuity procedure (e.g. SR-VCC).

As for developments of the apparatuses according to the first example of the present invention, the operator may be configured to operate as mobile switching center server enhanced for centralized services or as basic mobile switching center server enhanced for the call continuity procedure. Further, the initial message may further comprise an indication of the centralized service-related subscription information.

In addition, the centralized service-related subscription information may be received constituting at least a portion of a diameter command. Further, the diameter command may be an update location answer command and the portion may be a subscription data attribute value pair or an extension to that attribute value pair.

Finally, the initial message may be constituted by a (single radio voice call continuity) packet switched to circuit switched request; the initial message may be transmitted via a general packet radio service tunneling protocol interface; the call continuity procedure may be constituted by a single radio voice call continuity procedure; the centralized service-related subscription information may relate to internet protocol multimedia subsystem centralized services, and/or the centralized service-related subscription information may constitute an additional information element in the initial message.

Figure 5A:
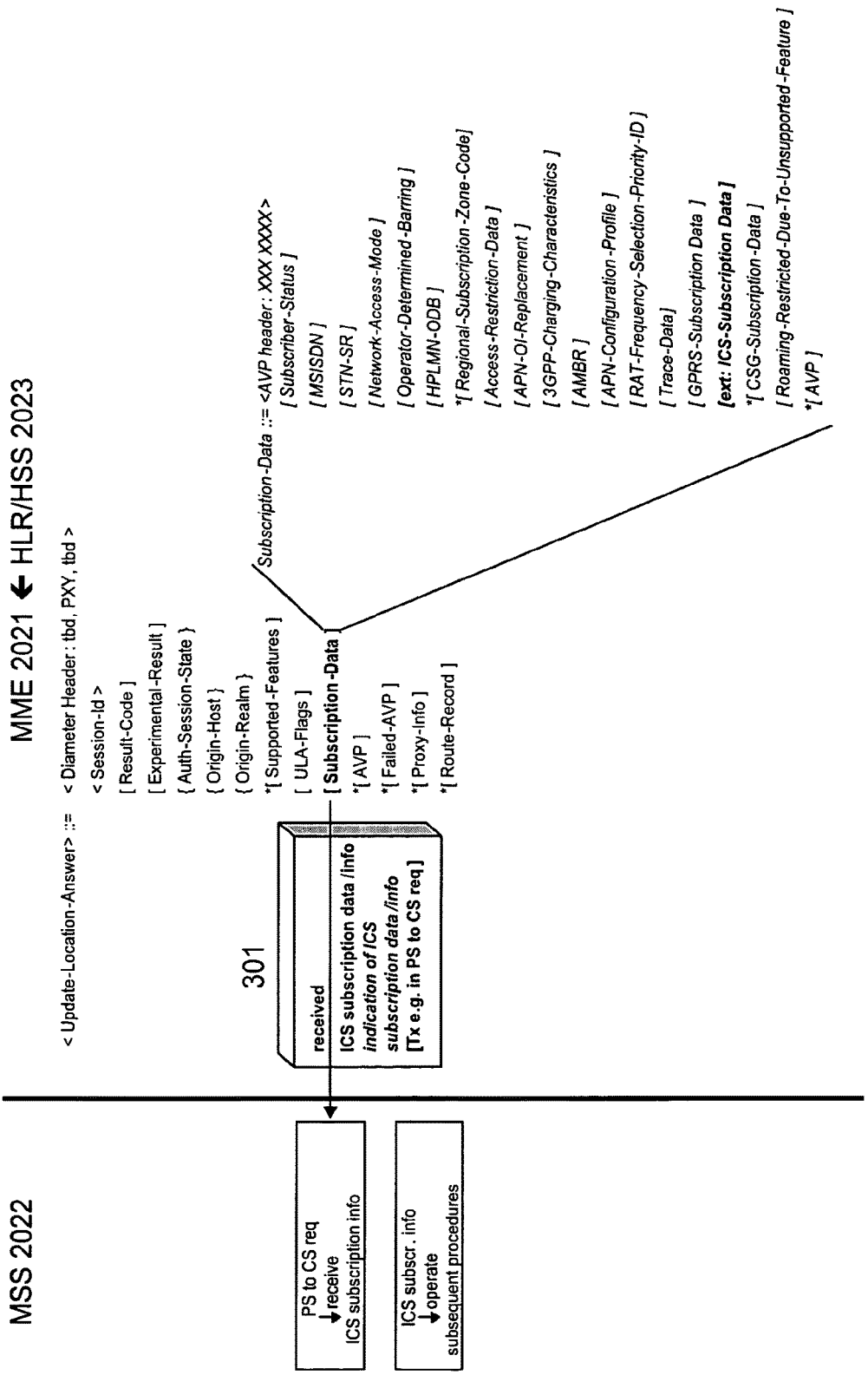
FIG. 5A shows a data structure for subscription information delivery according to the first example of the present invention.

Furthermore, FIG. 5A shows a data structure according to the first example of the present invention. As shown in FIG. 5A, the data structure may comprise at least a portion of a diameter command for conveying centralized service-related subscription information.

As a development, the diameter command may be an update location answer command and the portion may be one of a subscription data attribute value pair and an extension of the subscription data attribute value pair.

Furthermore, another data structure 301 according to the first example of the present invention may comprise an initial message (e.g. PS to CS Req) of a call continuity procedure (e.g. SR-VCC) comprising the received (e.g. ICS) centralized service-related subscription information.

Second Example

In addition or alternative to the above-described first example, FIGS. 2A, 2B, 3B and 4B show a second example of the present invention.

Concerning the methods, apparatuses, computer programs and data structures, reference signs identical to those used in the first example represent the same or similar portions, and the description of the same is omitted for the sake of description brevity.

There may occur a case in which the HSS 2023 may decide to change data related the user's data, and thus the HSS 2023 may initiate a subscriber data update, in an optional step S1-1a. That is, the receiving performed in optional step S1-1a in the first example becomes, in the second example, the above-described event in the HSS 2023.

As a development of the method related to the HSS 2023 as well as to the HSS 2023 itself, the diameter command may be an insert subscriber data request command and the portion may be a subscription data attribute value pair or an extension of a subscription data attribute value pair.

Furthermore, as shown in FIG. 5B, the data structure may in this case be configured such that the diameter command may be an insert subscriber data request command and the portion may be a subscription data attribute value pair or an extension of a subscription data attribute value pair.

In the second example, the diameter request from the MME 2021 to the HLR/HSS 2023 may be omitted.

Furthermore, concerning both the first and second examples of the present invention, at least one of, or more of the above-described transmitter 20213, the receiver 20224 and the operator 20225 as well as the MME 2021 and the MSS 2022, or the respective functionalities carried out, may be implemented as a chipset or module.

Finally, the present invention also relates to a system which may comprise the MME 2021, the MSS 2022 and the HSS 2023 according to the above-described first and second examples of the present invention.

Without being restricted to the details following in this section, the embodiment of the present invention may be summarized as follows:
The idea is to make ICS enhanced MSC aware of whether a subscriber has an ICS subscription or not, so that ICS functionality can be used during the SR-VCC.

For enabling the ICS operation during the SRVCC, the subscription information of the subscriber should be available at the MSS during the SRVCC is initiated. With the currently defined SRVCC functionality, the information is available only after the SRVCC is completed and the location update has been done. Accordingly, the present invention may enable the ICS functionality with the SRVCC.

Example for Implementation

The ICS subscription information may be received from the HLR or Home Subscriber Server (HSS) to the MME during the evolved universal mobile telecommunications system (UMTS) terrestrial radio access network (eUTRAN) attach procedure, together with other subscriber profile information. To carry the information, e.g. Subscription-Data attribute value pair (AVP) e.g. of the "Insert Subscriber Data" request could be extended.

The indication of ICS subscription may then be carried from the MME to MSC e.g. in the initial request (such as a PS to CS request) during SR-VCC. This request could be extended with an additional information element such as ICS subscription taking values 0 or 1. When the value 0 could mean that the subscription does not exist and the value 1 could mean that the subscription exists. After receiving the indication, the MSC may either work as a basic SR-VCC enhanced MSC or as an ICS enhanced MSC (defined in TS 23.292). MME operation is not affected.

FIG. 2B describes the signaling based on the current release 8 SR-VCC functionality. It is proposed to add ICS-subscription information to the MME's subscription information, which it receives from the HLR/HSS during the terminal attachment to the EPS. During the SR-VCC, the ICS subscription information would be carried from the MME to the MSS in the initial message from the MME to the MSS (e.g. steps S1-2, S2-1 in FIG. 2). With this information, the eMSS functionalities may be activated on a per subscriber basis for the user. It may then be left to the eMSS implementation at which point the HLR is done.

Example Functionalities

It is proposed that the ICS related subscription information is downloaded to MME from HSS (e.g. S6a) Diameter based Interface during E-UTRAN attach procedure.

The following diameter command may be updated:
Insert HSS User Profile procedure. A possible AVP for the ICS subscription data is to include that data as a part of the "Subscription-Data" AVP of the Insert Subscriber Data request.

The following GPRS Tunneling Protocol (GTP) request may be updated:
SR-VCC PS to CS request. A possible new information element containing required values for ICS subscription.

Delivery of ICS subscription information from the MME to the eMSS for enabling the ICS operation in the eMSS (e.g. steps S1-2 and S2-1 in FIG. 2)

While MSS receives the ICS subscription information it can either work as MSC Server enhanced for ICS as defined in the 3GPP TS 23.292, or it can function as a basic MSS enhanced for SRVCC. MME does not need to know, which option the MSS supports. On the other hand, the information delivered in steps S1-2 and S2-1 in FIG. 2 enables the MSS function as configured to the subscriber's subscription information.

Further Examples

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

A network may be any device, unit or means by which a station entity or other user equipment may connect to and/or utilize services offered by the access network; such services include, among others, data and/or (audio-) visual communication, data download etc.; generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M) IPv4/6, is also applicable; a user equipment may be any device, unit or means by which a system user may experience services from an access network; method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved; generally, any method step is suitable to be implemented as software or by hardware without changing the idea of the invention in terms of the functionality implemented; method steps and/or devices, units or means likely to be implemented as hardware components at the above-defined apparatuses, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/ or devices, units or means likely to be implemented as software components may alternatively be based on any security architecture capable e.g. of authentication, authorization, keying and/or traffic protection; devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved; an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor; a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

The invention claimed is:

1. A method performed by a mobile switching center server, comprising:
receiving, from a mobility management entity, in an initial message of a single radio voice call continuity procedure, information that is derived from an update location answer command and that indicates whether a subscriber is subscribed to internet protocol multimedia subsystem centralized services; and operating according to the received information whether a subscriber is subscribed to internet protocol multimedia subsystem centralized services as a mobile switching center server enhanced for internet protocol multimedia subsystem centralized services, wherein the initial message comprises a single radio voice call continuity packet switched to circuit switched request, the information indicating whether the subscriber is subscribed to internet protocol multimedia subsystem centralized services comprises an additional information element, and the additional information element has a first pre-determined value when the subscription does not exist, and a second pre-determined value when the subscription exists.

2. The method according to claim 1, wherein the initial message is transmitted via a general packet radio service tunneling protocol interface.

3. An apparatus, comprising:

a physical receiver configured to receive, from a mobility management entity, in an initial message of a single radio voice call continuity procedure, information that is derived from an update location answer command and that indicates whether a subscriber is subscribed to internet protocol multimedia subsystem centralized services; and a physical processor configured to operate according to the received information whether a subscriber is subscribed to internet protocol multimedia subsystem centralized services as a mobile switching center server enhanced for internet protocol multimedia subsystem centralized services, wherein the initial message comprises a single radio voice call continuity packet switched to circuit switched request, the information indicating whether the subscriber is subscribed to internet protocol multimedia subsystem centralized services comprises an additional information element, and the additional information element has a first pre-determined value when the subscription does not exist, and a second pre-determined value when the subscription exists.

4. The apparatus according to claim 3, wherein the apparatus is constituted by an enhanced mobile switching center server.

5. The apparatus according to claim 3, wherein at least one or more of the receiver, the processor, and the apparatus is implemented as a chipset or module.

* * * * *